(12) United States Patent
Acobas

(10) Patent No.: US 9,630,395 B2
(45) Date of Patent: Apr. 25, 2017

(54) PRINTING MACHINE

(71) Applicant: Printgraph Waterless S.P.A., Settimo Milanese (IT)

(72) Inventor: Roberto Levi Acobas, Milan (IT)

(73) Assignee: Printgraph Waterless S.p.A., Milan (IT)

( * ) Notice: Subject to any disclaimer, the term of this patent is extended or adjusted under 35 U.S.C. 154(b) by 0 days.

(21) Appl. No.: 14/440,258

(22) PCT Filed: Nov. 5, 2013

(86) PCT No.: PCT/EP2013/073071
§ 371 (c)(1),
(2) Date: May 1, 2015

(87) PCT Pub. No.: WO2014/072296
PCT Pub. Date: May 15, 2014

(65) Prior Publication Data
US 2015/0283802 A1    Oct. 8, 2015

(30) Foreign Application Priority Data

Nov. 7, 2012    (IT) .............. MI2012A1900

(51) Int. Cl.
| | | |
|---|---|---|
| B41F 17/00 | (2006.01) |
| B41J 29/12 | (2006.01) |
| B41F 22/00 | (2006.01) |
| C09J 7/02 | (2006.01) |
| B65C 9/00 | (2006.01) |

(52) U.S. Cl.
CPC .............. B41F 17/00 (2013.01); B41F 22/00 (2013.01); B41J 29/12 (2013.01); B65C 9/0015 (2013.01); C09J 7/0296 (2013.01)

(58) Field of Classification Search
CPC ........ B05B 15/045; B41F 22/00; B41F 17/00; B41J 29/12; C09J 7/0296; B65C 9/0015
See application file for complete search history.

(56) References Cited

U.S. PATENT DOCUMENTS

| | | |
|---|---|---|
| 2003/0015111 A1 | 1/2003 | Rizika et al. |
| 2003/0192443 A1 | 10/2003 | Klamann et al. |
| 2010/0059175 A1* | 3/2010 | Georges .................. B05D 5/06 156/280 |
| 2012/0192739 A1 | 8/2012 | DeMoore et al. |

FOREIGN PATENT DOCUMENTS

| | | |
|---|---|---|
| EP | 1334843 A2 | 8/2003 |
| WO | WO0118139 A1 | 3/2001 |
| WO | WO2013166274 A2 | 11/2013 |

OTHER PUBLICATIONS

International Search Report dated Dec. 3, 2013; International Application No. PCT/EP2013/073071; International Filing Date: Nov. 5, 2013; 4 pages.

* cited by examiner

*Primary Examiner* — Blake A Tankersley
*Assistant Examiner* — Marissa Ferguson Samreth
(74) *Attorney, Agent, or Firm* — Blank Rome LLP

(57) ABSTRACT

The printing machine comprising at least one protective replaceable self-adhesive film (1) at least for the principal surfaces most affected by splashes of ink and/or varnish and by the normal accumulation of dirt.

10 Claims, 1 Drawing Sheet

PRINTING MACHINE

The present invention refers to machines used in the graphic-editorial industry and for printing packaging, pre-press and converting such as for example offset, flexographic, rotogravure and digital printing machines, developers, computer-to plate, glueing and dye-cutting machines and others.

These machines reach production speeds such as to result in the emission of ink and dye splashes and, in particular processes, also of glues and adhesives; these splashes, to which can be added dirt caused by accidental spillages of ink or adhesives or dyes, or carelessness by the operators, are deposited on the external structure, soiling it extensively.

These stains, which are particularly difficult to eliminate, are also to be added to the normal accumulation of dirt, such as, for example, dust, grease and oil, typical of industrial production environments. For cleaning, aggressive solvents must be used which, over time, irremediably damage the paint which covers the printing machines externally with a consequent loss in their commercial value.

The task of the present invention is to create a printing machine which makes it possible to eliminate the technical disadvantages complained of in the known art. Within the scope of this technical task an object of the invention is to create a printing machine protected at least at the principal surfaces most affected by splashes of ink and/or varnish and/or glues/adhesives and by the normal accumulation of dirt.

It is a further object of the invention to have a printing machine which makes it possible to speed up maintenance operations and possibly even to assign them to unskilled personnel.

The technical task, and these and other objects, according to the present invention are achieved by creating a printing machine characterised by comprising at least one protective, self-adhesive and replaceable film attached at least to the principal surfaces most affected by splashes of ink, varnish, glue or dye and by the normal accumulation of dirt, said protective film comprising at least one polymeric substrate having a first surface coated with adhesive and a second surface, opposite the first surface, suitably modified by a treatment in such a way as to ensure repellence to all the types of ink and varnishes used in the graphic and packaging industry, and possibly to glues and adhesives used in this same sector, in such a way as to ensure ease of cleaning and a suitable chemical resistance to the most common washing solutions.

The present invention also applies to a developer, computer-to plate, glueing and dye-cutting machine and similar characterised by comprising at least one protective, self-adhesive and replaceable film attached at least to the principal surfaces most affected by splashes of ink, varnish, glue or dye and by the normal accumulation of dirt, said protective film comprising at least one polymeric substrate having a first surface coated with adhesive and a second surface, opposite the first surface, suitably modified by a treatment in such a way as to ensure repellence to all the types of ink and varnishes used in the graphic and packaging industry.

Preferably the protective film has mechanical characteristics suitable for conforming and adapting it easily to the profiles of the structure of the printing machines, developers, computer-to plate, glueing and dye-cutting machines and others.

Thanks to its repellence to inks, glues and dyes, the protective film enables easy regular maintenance which preserves the machine over time from scratches and wear.

The replaceable protective film has an adhesive coating configured in such a way that it can adhere perfectly to the parts to be protected and can be removed easily therefrom so that it can be replaced in case of necessity without leaving residues. The protective film preferably has mechanical and thermal properties such as not to stiffen it and to keep it easily thermoformable when being applied without the formation of splits and/or cracks.

The protective film can preferably be provided in a suitably die-cut form to match the specific model of printing machine to be protected, in such a way as to allow initial application or maintenance even by unskilled personnel.

The protective film can be sold as an accessory in packs containing the number of pieces sufficient to completely protect the printing machine.

The protective film can if necessary be customised by printing with trademarks, logos or writing according to the specific requirements of the end user.

In this case, a printable polymeric substrate coated with adhesive is preferably used, and the protective surface treatment is carried out on the previously-printed polymeric substrate.

Further characteristics of the present invention are also defined in the claims which follow.

Further characteristics and advantages of the invention will more fully emerge from the description of preferred but not exclusive embodiments of the printing machine according to the invention, illustrated by way of indicative and non-limiting example in the accompanying drawings, in which.

Figure 1:
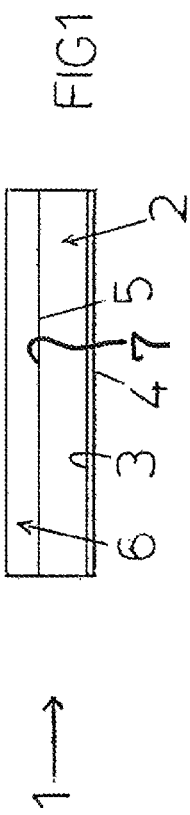
FIG. 1 shows the structure of the protective film.

With reference to the aforementioned drawings, a printing machine 10 is shown comprising a base 11 suitable for supporting sides or shoulders 12 which support the printing cylinders and the complete inking and wetting unit.

For other types of printing machines, developers, computer-to plate, glueing and dye-cutting machines and others, falling within the scope of the present invention, the specification may not include printing cylinders (e.g. on digital machines) and/or the entire inking and/or wetting unit.

The machine comprises protection means at least for the principal surfaces 16 most affected by splashes of ink and/or varnish and by the normal accumulation of dirt. In particular the protection means comprise at least one protective film 1 attachable to said principal surfaces 16.

The protective film 1 comprises a substrate 2 having a first surface 3 which is in contact with said principal surfaces 16 and is coated with an adhesive substance 4, and a second surface 5, opposite the first surface 4, coated with a varnish 6 having high repellence to aggressive agents such as inks, varnishes, glues/adhesives and the solvents used in the graphic and packaging industry. Further, a print 7 of a graphic representation could be located between the second surface 5 of the substrate 2 and the varnish 6.

Preferably the adhesive substance 4 is in the form of a layer of uniform thickness. The varnish 6, too, is in the form of a layer of uniform thickness which entirely coats the second surface 5 of the substrate 2.

The protective film 1 is thermoformable and adaptable to the profiles of said principal surfaces of the printing machine.

Advantageously the varnish 6 has substantially the same physical characteristics of elongation and thermoformability as the adhesive-coated substrate 2.

The protective film, furthermore, is die-cut in the shape of said principal surfaces of the printing machines, developers, computer-to plate, glueing and dye-cutting machines and others, which can vary from machine to machine.

The protective film 1 preferably has an overall thickness comprised between 25 μm and 500 μm, while the adhesive-coated substrate 2 alone has a thickness greater than 20 μm, and is printable if required.

The substrate 2 can be made of a material comprising at least one among PVC, polyurethane, polyester, polycarbonate, polyacrylates, copolymers and polymeric blends or polymers produced from renewable sources, for example of vegetable origin.

The adhesive substance 4 can be acrylic-, UV- and solvent-based.

The varnish 6 applied as a surface finish to the second surface 5 of the substrate 2 can be of the type crosslinkable by radiation having at least one wavelength in the ultraviolet range or in the range comprised between the ultraviolet and the visible or in the visible range, or it can be water- or solvent-based, one- or two-part, thermosetting or catalysed.

Advantageously the varnish 6 is preferably of the crosslinkable type with light emitted by low-pressure fluorescent lamps or by lamps based on high-pressure mercury only or with the addition of halides of Fe, Pb, As, Ga, In or other metals, or with pulsed Xenon lamps.

Alternatively the varnish 6 can be of the crosslinkable type with LED light sources which emit at various wavelengths in a range between 200 and 450 nm.

This protective varnish 6 has a thickness less than 50 μm, preferably less than 25μ. The varnish 6 has chemical and physical characteristics suitable for simultaneously attaining excellent adhesion to the substrate 2, high flexibility, high scratch resistance, high capacity for elongation, high thermoformability, excellent resistance to solvents, high repellence to the various types of ink (grease-, water- or solvent-based), is very easily cleaned of the various types of glues/adhesives (typically acrylic dispersions), very easily cleaned of all types of ink (grease-, water- or solvent-based) with a wide range of washing solvents.

To obtain these characteristics it has been shown to be convenient to use a formulation for varnish 6 providing in suitable concentration: one or more polyfunctional aliphatic acrylated urethanes, which confer adhesive capacity, flexibility, chemical resistance, elongation and thermoformability; one or more mono- and difunctional acrylate monomers, which confer adhesive capacity, wettability, flexibility; one or more fluorinated polymers which confer hydrophobicity, lipophobicity, release; one or more acrylated silicones and/or silica in the form of micro- and nanoparticles and/or functionalised particles which confer release and chemical and mechanical resistance.

Preferably the formulation of the varnish 6 also specifies alpha-hydroxy ketones and ketone-derived phosphinoxides and morpholine as radical photoinitiators which confer speed and degree of polymerisation.

Preferably the varnish 6 is formulated without the use of solvents.

Alternatively, a UV varnish can be formulated with cationic mechanism, or a non-UV water-based, solvent-based or two-part varnish, provided that it satisfies the above requirements.

Some examples are given below of protective films conforming to preferred embodiments of the present invention.

The varnish can be applied in sheets or reel form according to all the known techniques, for example spreading, flexography, rotogravure, reverse roll coating, screen printing or other method including digital printing techniques.

EXAMPLE 1

Using a screen printing process, on the non-adhesive coated side of a die-cut sheet with dimensions 122 cm×23.5 cm of a 75 μm film of RI-JET 75 GLOSS CLEAR ASP26 PERMANENT WK135 manufactured by RITRAMA SpA, a 10 μm thickness of UV-crosslinked varnish is applied, produced according to the following formula expressed in percentage parts:

| | |
|---|---|
| Aliphatic acrylated urethane | 45 |
| Monoacrylate monomer | 16 |
| Diacrylate monomer | 16 |
| Alpha-hydroxy ketone | 3 |
| Acrylated silicone | 5 |
| Fluorinated polyolefin | 10 |
| Silica nanoparticles | 5 |

The sheet is used to protect one side of the right shoulder of a 2011 Komori G40 printing machine.

EXAMPLE 2

A reel of 75 μm RI-JET 75 CLEAR PE GLOSS CLEAR ASP26 PERMANENT WKPE 144 film manufactured by RITRAMA SpA is printed on the non-adhesive coated side with decorative figures using a solvent inkjet printer. Subsequently, using a flexographic printing process, a 4 μm thickness of UV-crosslinked varnish is applied, produced according to the following formula expressed in percentage parts:

| | |
|---|---|
| Aliphatic acrylated urethane | 34 |
| Monoacrylate monomer | 21 |
| Diacrylate monomer | 21 |
| Alpha-hydroxy ketone | 5 |
| Acrylated silicone | 5 |
| Fluorinated polyolefin | 10 |
| Silica nanoparticles | 4 |

EXAMPLE 3

Using a rotogravure process, on the non-adhesive coated side of a reel of 150 μm thickness Avery® 7541 transparent PVC functional film produced by AVERY DENNISON Graphics Division, a 6 μm thickness of UV-crosslinked varnish is applied, produced according to the following formula expressed in percentage parts:

| | |
|---|---|
| Aliphatic acrylated urethane | 38 |
| Monoacrylate monomer | 19 |
| Diacrylate monomer | 19 |
| Alpha-hydroxy ketone | 4 |
| Acrylated silicone | 5 |
| Fluorinated polyolefin | 10 |
| Silica nanoparticles | 5 |

Figure 2:
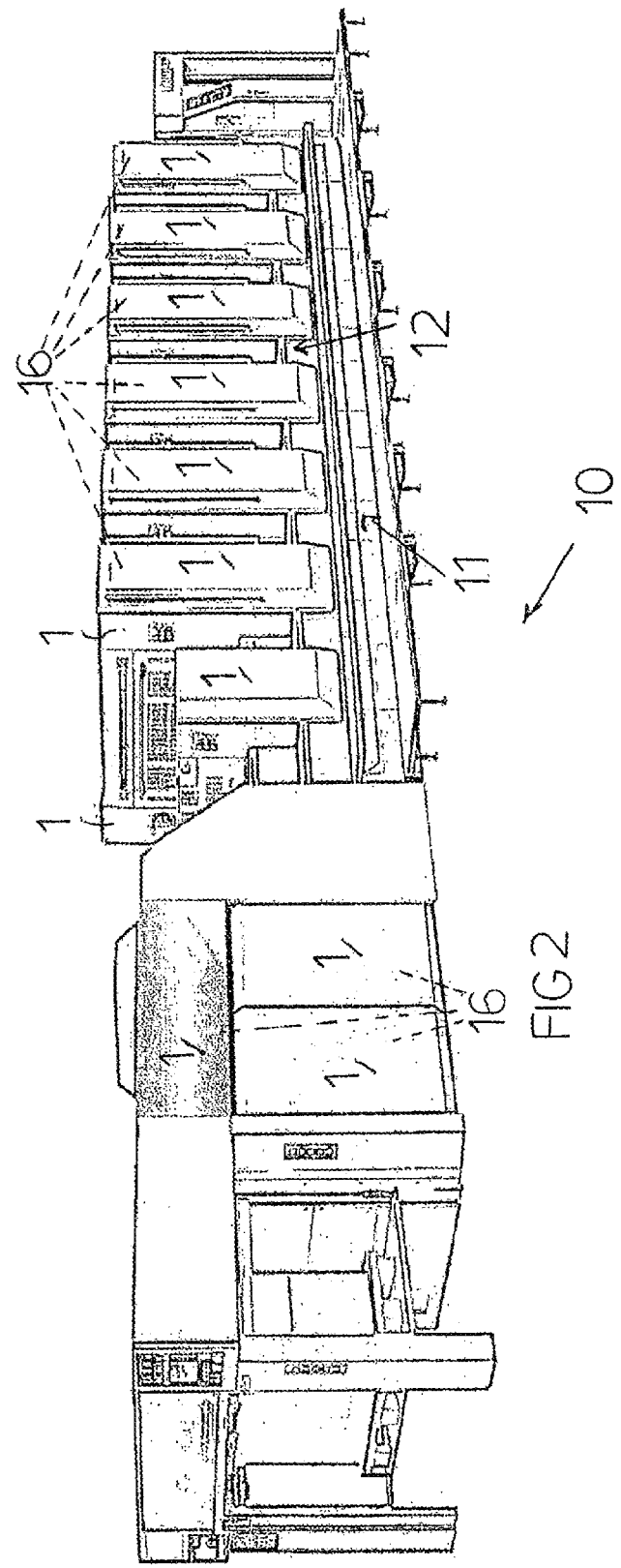
FIG. 2 shows an offset printing machine featuring the protective film.

The printing machine according to the present invention can be of any type, including other than the offset printing machine depicted in FIG. 2. For example the field of application is extendable to rotary offset, rotogravure, flexographic or digital etc. printing machines.

The printing machine according to the invention, thanks to the provision of the protective film repellent to all types of ink and varnishes used in the graphic and packaging industry, and possibly to glues and adhesives used in this same sector, is cleanable and washable extremely easily without requiring specialist personnel.

The printing machine as conceived herein is susceptible of many modifications and variants, all falling within the scope of the inventive concept; furthermore, all the details are replaceable by technically equivalent elements.

The materials used, as well as the dimensions, may in practice be of any type according to requirements and the state of the art.

The invention claimed is:

1. A printing machine comprising:
principal surfaces including operating equipment enclosures and equipment support structure including an equipment base having sides or shoulders, the equipment base supporting one or printing cylinders or one or more inking and wetting units of said printing machine;
at least one protective replaceable self-adhesive film attached to said principal surfaces of said printing machine affected by splashes of inks, varnish, glues, adhesives, or dyes and by normal accumulation of dirt, said protective replaceable self-adhesive film being thermoformable and conformed to said principal surfaces of the printing machine, said protective replaceable self-adhesive film comprising a polymeric substrate having a first surface coated with an adhesive substance in contact with said principal surfaces and a second surface, opposite the first surface, coated with a varnish having high repellence to aggressive agents such as the inks, varnish, glues, adhesives, or dyes and solvents used in a graphic and packaging industry.

2. A printing machine according to claim 1, wherein between said second surface of said substrate and said varnish there is a print of a graphic representation.

3. A printing machine according to claim 1, wherein said substrate has a thickness greater than 25 microns and said varnish has a thickness less than 50 microns.

4. A printing machine according to claim 1, wherein said varnish has the same physical characteristics of elongation and thermoformability as said substrate.

5. A printing machine according to claim 1, wherein said protective film is die-cut according to variable shapes of said principal surfaces of said printing machine.

6. A printing machine according to claim 1, wherein said substrate is made of material comprising at least one among PVC, polyurethane, polyester, polycarbonate, polyacrylates, copolymers, and polymeric blends or polymers produced from renewable sources.

7. A printing machine according to claim 1, wherein said varnish is a UV-crosslinked varnish which has a formulation comprising at least one aliphatic acrylated urethane, at least one among a monoacrylate monomer or a diacrylate monomer, at least one photoinitiator, at least one among an acrylated silicone or silica, and at least one fluorinated polymer.

8. A printing machine according to claim 1, wherein said varnish is a non-UV water-based, solvent-based, or two-part varnish.

9. A developer, computer-to-plate, gluing and dye-cutting machine comprising:
principal surfaces including operating component enclosures and equipment support structure including an equipment base having sides or shoulders, the equipment base supporting one or more operating components of said machine;
at least one protective replaceable self-adhesive film attached to said principal surfaces affected by splashes of inks, varnish, glues, adhesives, or dyes and by normal accumulation of dirt, said protective replaceable self-adhesive film being thermoformable and conformed to said principal surfaces, said protective replaceable self-adhesive film comprising a polymeric substrate having a first surface coated with an adhesive substance in contact with said principal surfaces and a second surface, opposite the first surface, coated with a varnish having high repellence to aggressive agents such as the inks, varnish, glues, adhesives, or dyes and solvents used in a graphic and packaging industry.

10. A printing machine comprising:
equipment support structure including an equipment base having sides or shoulders, the equipment base supporting one or printing cylinders or one or more inking and wetting units of said printing machine;
at least one protective replaceable self-adhesive film attached to said equipment support structure of said printing machine affected by splashes of inks, varnish, glues, adhesives, or dyes and by normal accumulation of dirt, said protective replaceable self-adhesive film being thermoformable and conformed to said equipment support structure of the printing machine, said protective replaceable self-adhesive film comprising a polymeric substrate having a first surface coated with an adhesive substance in contact with said equipment support structure and a second surface, opposite the first surface, coated with a varnish having high repellence to aggressive agents such as the inks, varnish, glues, adhesives, or dyes and solvents used in a graphic and packaging industry.

* * * * *